Aug. 17, 1954 M. P. BAKER 2,686,697
TREAD CONSTRUCTION
Filed May 22, 1952 2 Sheets-Sheet 1

INVENTOR.
MAX P. BAKER
BY
Willits Hardman
HIS ATTORNEYS

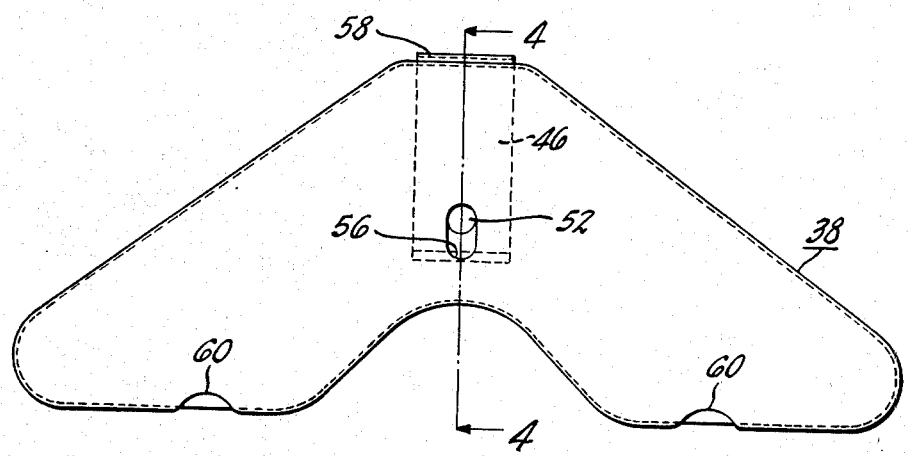
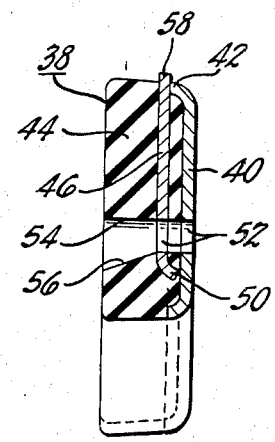
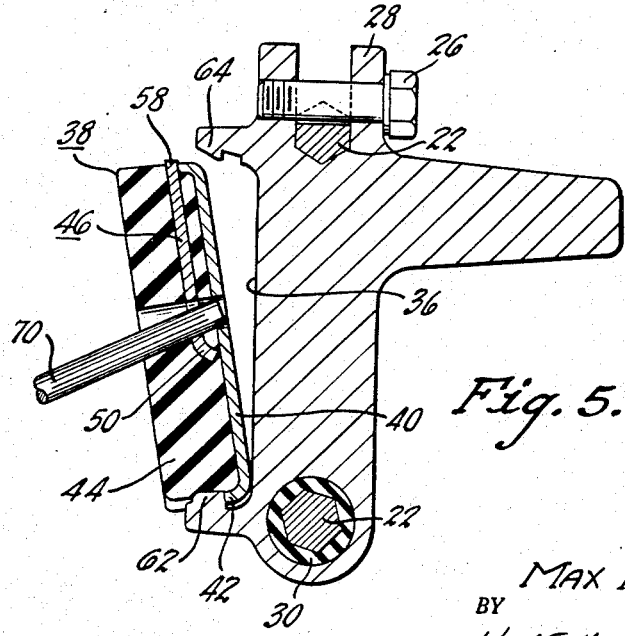

Patented Aug. 17, 1954

2,686,697

UNITED STATES PATENT OFFICE 2,686,697

TREAD CONSTRUCTION

Max P. Baker, Dayton, Ohio, assignor to General Motors Corporation, Detroit, Mich., a corporation of Delaware Application May 22, 1952, Serial No. 289,356

7 Claims. (Cl. 305—10)

This invention relates to endless treads and is particularly concerned with treads having rubber-like pads which are easily replaceable and/or removable from the grouser plates.

It is, therefore, the prime object of this invention to provide an endless tread construction wherein the tread pad, which is usually rubber, is removable and/or replaceable from the grouser plate with a minimum of effort.

In carrying out the above object, it is a further object to provide a relatively movable metallic insert within the rubber-like tread pad which may be manipulated so as to snap into place on the grouser plate. Reversal of operations will provide for the removal of the tread pad.

In the past, grouser plates have been used as treads for soft ground and the like whereas these same treads usually are provided with rubber-like tread pads when the vehicle, such as a tank or other endless tread type of vehicle, is traveling on paved roads or over rocky ground. This is explained by the fact that steel grouser plates cut up the roads and on rocky ground lose traction, for these reasons, rubber-like tread pads have been provided which are removable and/or replaceable whereas when the pads are in position, the tread of the vehicle is actually running on the rubber-like material of the tread pads.

These tread pads have normally been made with threaded inserts molded therein which are passed through apertures in the grouser plates and, through the use of nuts, act as a securing means for the rubber-like pad. It is apparent that in the average endless tread vehicle, such as a tank, many hundreds of bolts and nuts have had to be manipulated each time the treads are installed or removed. This is obviously a difficult task since, when the vehicle is in use, the backsides of the grouser plates are usually filled with mud, etc., making it very difficult to remove the nuts from the threaded studs.

Furthermore, this operation of removing or installing the tread pads is an extremely slow one, requiring considerable time in order to individually manipulate each nut throughout the endless tread.

This invention is therefore basically directed to a quick change tread pad which may be put in place upon the grouser plate with a minimum of effort and without the use of bolts and nuts, etc., and which may be removed from the grouser plate in an equally facile manner.

Therefore, it is another object of the invention to provide a quick change tread pad which may be snapped in and out of place without the use of wrenches and the like, thereby saving considerable time and effort on the part of the operator of the vehicle.

Further objects and advantages of the present invention will be apparent from the following description, reference being had to the accompanying drawings, wherein preferred embodiments of the present invention are clearly shown.

Fig. 3 is a plan view of the tread pad per se with the integral fastening device shown in dotted lines.

Fig. 4 is a sectional view of the tread pad taken on line 4—4 of Fig. 3.

Fig. 5 is a view similar to Fig. 2, showing the tread pad being removed through the use of a pin or bar.

While the description herein is directed to the main to tanks and their treads, due to the importance of this type of vehicle at the present time, it is understood that the invention described herein is equally applicable to any endless tread type vehicle tread, such as is used on tractors, for farm use, road or war work, tanks of all types, amphibious vehicles and in fact any type of vehicle that requires an endless type of tread wherein it is desirable to replace or remove the rubber-like tread pads.

Figure 1:
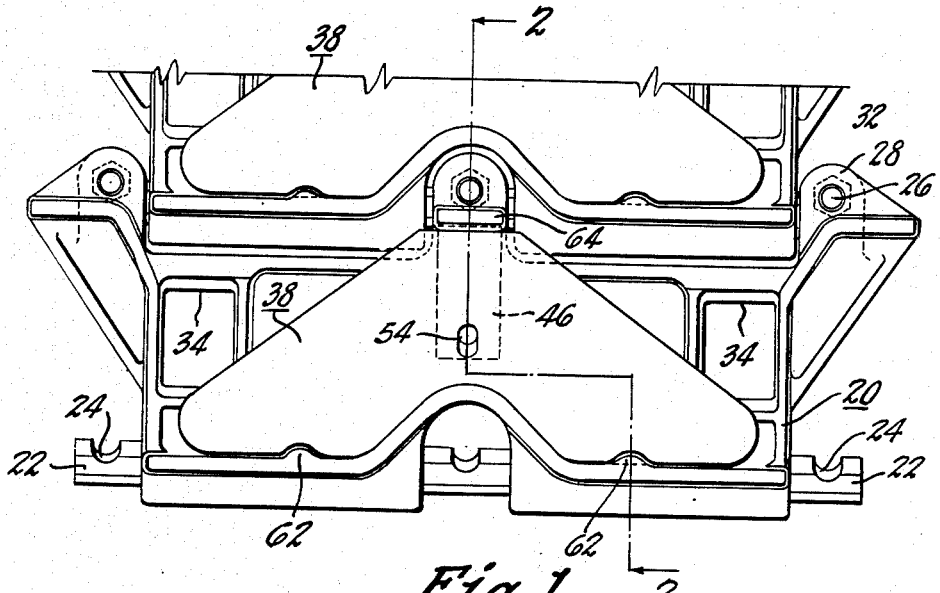
Fig. 1 is a fragmentary view of a traction device showing one full grouser plate and a portion of a second attached plate.
Figure 2:
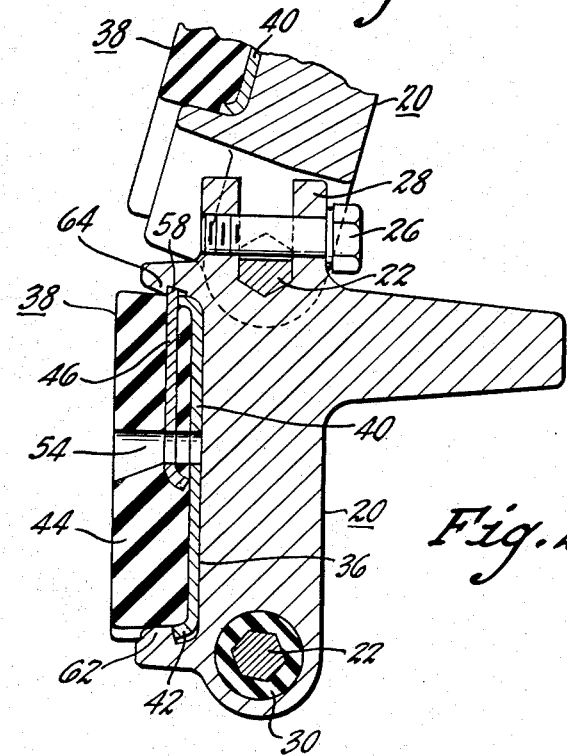
Fig. 2 is a sectional view taken on line 2—2 of Fig. 1, showing the tread pad in place.

In Fig. 1, a grouser plate is shown at 20 which includes a bar-like bushing pin 22 extending therethrough notched at 24 to provide an interlock for a bolt 26 shown in Fig. 2, whereby adjacent grouser plates are locked one to another by passing a bolt through a bifurcated fastening means 28 adjacent the notch 24 in the bushing pin 22. This permits one plate to move out of the plane of the other plate through a turning movement of the resilient bushings 30 of bushing pin 22, which bushings 30 are bonded to the bushing pin and are compressed within the grouser plate mounting hole. A second grouser plate 32 is shown in part in Fig. 1 and it is understood that a complete endless tread will include a sufficient number of these plates attached one to another to make an endless belt around the driving means (not shown) which coact with apertures 34 which are provided on each grouser plate. On the outer surface of the grouser plate 20, there is provided an indentation 36 generally triangular in shape, which indentation is made to accommodate a rubber-like tread pad 38 of the same general configuration and shown in Fig. 3. The pad 38 is made from any suitable resilient material and is molded to the desired shape and includes therein a metal support shown in one embodiment as a plate 40 which has turned up edges as at 42 therearound to receive the rubber-like material 44. The plate 40 is bonded to the rubber-like material so as to be integral therewith. Above the plate 40 and resting on the turned up edge 42, thereof, is a second plate 46 also molded and bonded to the rubber-like material 44. Plate 46 may be noted in Figs. 3, 4 and 5 and comprises a strip of metal, substantially flat, except for a turned down end portion 50 which is used to position the plate 46 during the molding operation and hold the plate 46 substantially parallel to the plate 40. It will be noted that the plates 40 and 46 are apertured at 52 and that the rubber-like material is cored out in alignment with said apertures to provide a hole 54 therethrough which is elongated at 56 at the upper surface thereof.

The end of plate 46 extends outwardly from the rubber-like material and the plate 40 to provide a lip 58 as shown in Fig. 4. The rubber-like material 44 of the tread pad 38 is cored out at two portions 60 as shown in Fig. 3 so that the turned up edge 42 is exposed at these points.

The grouser plate 20 is provided with two outwardly extending lips or pads 62 as noted in Fig. 1. These pads 62 are cast in the plate and extend into the cavity 36 whereby the tread pad may be hooked thereunder at the portions 60 thereof as noted in Fig. 5. On the opposite side of the grouser plate cavity 36, there is provided a single notched pad 64 which will engage the lip 58 of the plate 46. This is also noted in Fig. 4. In installing the tread pad 38, the notched out portions 60 thereof are first inserted beneath the pad 62 and then the opposite side of the pad 38 forced downwardly so that the lip 58 is driven down the tapered surface of the pad 64 until said lip 58 snaps into the notch of the pad 64. This is accomplished through relative lateral movement between the plate 36 and the plate 40 due to the inherent resiliency in the tread pad. In this position, the tread pad is locked in place within the grouser plate at three points and cannot be removed until a bar 70 is passed through the apertures 52 and manipulated as shown in Fig. 5, in which position the plate 46 is drawn laterally rearwardly so that the lip 58 thereof becomes disengaged from the notched pad 64. At this time the tread pad may be removed.

From this explanation, it is understood that the tread pad 38 is very easily installed or removed without the necessity of operating on any bolts or nuts, through the simple expedient of the use of a bar to disengage the plate 46 from the notched pad 64. It is equally as easy to merely insert the portions 60 thereof under the pads 62 and then, by striking the other side of the pad immediately above the projection 58 with a hammer, to drive this section under the notched pad 64 of the grouser plate.

From the foregoing, it will be readily understood that I have provided a snap-on type of tread pad which is easily installed, removed or replaced as the case may be and that the device includes no nuts, bolts or other difficult attachment means which must necessarily be manipulated during installation or removal of the tread pads. It is to be understood that while a three-point attachment means is disclosed, additional attachment points may be provided if desired without departing from the intent of my invention. This snap-on tread may be used on any type of wheel or tread wherein removable treads are useful.

It is manifest that the resilient material used in the tread pads may be any suitable resilient vulcanizable material which will bond to metal and which may be molded to shape. Any desirable compound of natural rubber, butadiene-styrene copolymers, butadiene-acrylonitrile copolymers, polychloroprene, reclaimed rubber or any compatible mixtures, etc., has been found suitable for use, the particular resilient rubber-like material used in the tread pad being no form of my invention, it merely being necessary that the material may be readily bonded to the metal parts and has sufficient resiliency to permit relative movement during installation and removal of the tread pads.

In the foregoing description, the grouser plate is described as being integral with the tread, it being understood that the grouser plate may be separate from the tread and of any suitable shape or design in accordance with the vehicle with which it is used. In other words, the term grouser plate as used herein is intended to define the outer surface of the receiving means for the tread pad.

While the embodiments of the present invention as herein disclosed, constitute preferred forms, it is to be understood that other forms might be adopted.

What is claimed is as follows:

1. A tread pad assembly to be used in combination with an endless tread, comprising, a grouser plate having an indented upper surface forming a cavity therein and including at least three attachment points extending inwardly of said cavity, a tread pad formed from resilient rubber-like material and having a metallic plate bonded thereto on the lower surface thereof, and a metallic insert within said rubber-like material and spaced from said metal plate and laterally movable with respect thereto, said metallic insert extending outwardly from the surface of said rubber-like pad whereby the pad may be attached to the grouser plate by positioning the metallic plate beneath two of said attachment points and then driving the front of the pad past a third point by causing relative movement between said metallic insert and said metal plate through the resilient rubber-like material.

2. The assembly as claimed in claim 1, wherein the tread pad includes an aperture through the insert in the plate whereby a bar may be positioned therein to move the insert relative to the plate for removal of the tread pad from the grouser plate.

3. An endless tread assembly, comprising in combination; a grouser plate, positioning means on the outer face of said plate, a resilient tread pad adapted to be carried by said plate and positioned relative thereto by said means, at least two attachment means on said grouser plate and at least two exteriorly accessible metallic inserts molded in and bonded to said pad so as to be aligned with said attachment means when the pad is in position relative to the grouser plate, one of said inserts being laterally movable relative to the other through the inherent resiliency within said pad whereby one insert may be inserted beneath its attachment means and then the other insert may be snapped into engagement with its attachment means for attaching the pad to the plate.

4. A tread pad assembly to be used in combination with an endless tread, comprising, a grouser plate having a cavity on one side thereof, a plurality of lips arranged around the edges of said cavity, a tread pad formed from resilient rubber-like material and at least two overlapping metal inserts molded therein and bonded thereto, said inserts having exteriorly accessible portions, at least one of which extends beyond the edge surface of said pad, whereby the pad may be snapped into place on the grouser plate in said cavity by inserting the exteriorly accessible portion of one of said inserts beneath said overhanging lips and by forcing said extending insert past its overhanging lip whereby said insert moves laterally relative to the other insert due to the inherent resiliency of the material in the rubber-like pad.

5. A tread pad assembly to be used in combination with an endless tread, including an easily removable, quick change pad thereon, comprising, a grouser plate including attachment means thereon to be associated with a pad for holding said pad in place, a tread pad formed from resilient rubber-like material adapted for attachment to said grouser plate through said attachment means, and catch means molded in and bonded to said pad adapted to be resiliently movable laterally through resilient deformation only of the pad with respect to one another whereby the pad may be snapped in place on said grouser plate through the lateral movement of said catch means relative to said attachment means.

6. A tread pad assembly to be used in combination with an endless tread, comprising in combination, a grouser plate having a plurality of spaced attachment means thereon, a tread pad including a strong metal backing plate and a resilient rubberlike facing attached thereto, catch means molded within said rubberlike facing and bonded thereto and in substantially isolated relation to said plate, said backing plate being adapted to interlock with at least one of the attachment means while said catch means is adapted to move with respect to the tread pad for providing snapping engagement with another of said attachment means for holding the tread pad to the grouser plate.

7. A tread pad assembly as claimed in claim 6, wherein said backing plate and said laterally movable catch means include aligned apertures so that removal of the pad from the grouser plate may be accomplished by use of a suitable tool in said apertures for prying the catch means into unlatching engagement with its associated attachment means.

References Cited in the file of this patent

UNITED STATES PATENTS

| Number | Name | Date |
|---|---|---|
| 1,635,596 | White | July 12, 1927 |

FOREIGN PATENTS

| Number | Country | Date |
|---|---|---|
| 968,280 | France | Apr. 12, 1950 |